(12) United States Patent
Liu et al.

(10) Patent No.: US 9,693,376 B2
(45) Date of Patent: Jun. 27, 2017

(54) SIGNAL TRANSMISSION METHOD AND DEVICE

(71) Applicant: China Academy of Telecommunications Technology, Beijing (CN)

(72) Inventors: Jiamin Liu, Beijing (CN); Bin Jiao, Beijing (CN); Fangli Xu, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 54 days.

(21) Appl. No.: 14/412,455

(22) PCT Filed: Jun. 18, 2013

(86) PCT No.: PCT/CN2013/077401
§ 371 (c)(1),
(2) Date: Jan. 1, 2015

(87) PCT Pub. No.: WO2014/005481
PCT Pub. Date: Jan. 9, 2014

(65) Prior Publication Data
US 2015/0173113 A1    Jun. 18, 2015

(30) Foreign Application Priority Data
Jul. 4, 2012  (CN) .......................... 2012 1 0230624

(51) Int. Cl.
*H04W 72/04*  (2009.01)
*H04W 76/02*  (2009.01)
*H04W 8/00*   (2009.01)

(52) U.S. Cl.
CPC ......... *H04W 76/021* (2013.01); *H04W 8/005* (2013.01); *H04W 72/042* (2013.01)

(58) Field of Classification Search
None
See application file for complete search history.

(56) References Cited

U.S. PATENT DOCUMENTS

2011/0098043 A1* 4/2011 Yu ........................ H04W 60/00
                                                        455/435.1
2013/0170398 A1* 7/2013 Kwon ................... H04W 8/005
                                                        370/255
(Continued)

FOREIGN PATENT DOCUMENTS

CN        1371583 A       9/2002
CN      102090132 A       6/2011
(Continued)

OTHER PUBLICATIONS

Extended European Search Report issued on Jun. 22, 2015 in the EP counterpart application (13812873.1).
(Continued)

*Primary Examiner* — Chi H Pham
*Assistant Examiner* — Soon-Dong D Hyun
(74) *Attorney, Agent, or Firm* — Kilpatrick Townsend & Stockton LLP

(57) ABSTRACT

Disclosed are a signal transmission method and device, which are used to realize a technical solution whereby UE find one another under the control of a mobile communication network. The signal transmission method provided in the present invention comprises: UE acquiring resource location information from a network side, which is used for indicating the UE to send an identification signal of the UE; and the UE determining a specific resource which sends the identification signal according to the resource location information, and sending the identification signal of the UE over the specific resource.

12 Claims, 7 Drawing Sheets

(56) References Cited

U.S. PATENT DOCUMENTS

| | | | |
|---|---|---|---|
| 2014/0120907 A1* | 5/2014 | Yu | H04W 76/023 455/426.1 |
| 2014/0153390 A1* | 6/2014 | Ishii | H04W 76/023 370/230 |
| 2015/0023267 A1* | 1/2015 | Lim | H04L 1/1854 370/329 |
| 2015/0181366 A1* | 6/2015 | Chae | H04W 56/004 370/336 |

FOREIGN PATENT DOCUMENTS

| | | |
|---|---|---|
| WO | 2011/063845 A1 | 6/2011 |
| WO | 2011121374 A1 | 10/2011 |

OTHER PUBLICATIONS

International Search Report and Written Opinion for PCT/CN2013/077401.

* cited by examiner

SIGNAL TRANSMISSION METHOD AND DEVICE

The present application is a US National Stage of International Application No. PCT/CN2013/077401, filed 18 Jun. 2013, designating the United States, and claiming priority to a Chinese Patent Application No. 201210230624.3, filed with the State Intellectual Property Office of China on Jul. 4, 2012 and entitled "Signal transmission method and device", which is hereby incorporated by reference in its entirety.

FIELD OF THE INVENTION

The present invention relates to the field of communications, and particularly to a signal transmission method and a signal transmission device.

BACKGROUND OF THE INVENTION

Referring to FIG. 1, a network centralized control mode is adopted in LTE (Long Term Evolution) system, that is, both the uplink data and the downlink data of UE (user equipment) are transmitted and received under the control of a network. Communications between one UE and another UE are forwarded and controlled by the network. There is no direct communication link between two UEs, and the UE is also not allowed to transmit the uplink data spontaneously.

Referring to FIG. 2, the existing D2D (Device to Device) communication refers to direct communication between one UE and another UE through technologies of Bluetooth, Wifi (Wireless Fidelity) and the like, such communication utilizes license-free frequency band resources, and is the own behavior of users, free from the management and control of a network operator, and limited in application scenes.

Another mode is introducing a D2D technology in a mobile communication operator network. In this D2D communication mode, direct communication between one UE and another UE is allowed to a certain extent, and these direct communication links may be established under the control or assistance of a network. The basis of carrying D2D communication between one UE and another UE is discovering the close UE.

However, in the prior art, there are no technical solutions of the mutual discovery of UEs under the control of a mobile communication network.

SUMMARY OF THE INVENTION

The embodiments of the present invention provide a signal transmission method and a signal transmission device, which are used for realizing the technical solution of the mutual discovery of UEs under the control of a mobile communication network.

An embodiment of the present invention provides a signal transmission method, which including:

acquiring, by a UE, resource position information, used for indicating the UE to transmit identification signal of the UE, from a network side; and determining, by the UE, a specific resource for transmitting the identification signal according to the resource position information, and transmitting the identification signal of the UE on the specific resource.

An embodiment of the present invention provides a signal reception method, including:

acquiring, by a UE, information required for receiving identification signals of other UE from a network side; and receiving and decoding, by the UE, the identification signals of the other UE according to the information.

An embodiment of the present invention provides a signal transmission device, which includes:

an information acquisition component, configured to acquire resource position information used for indicating UE to transmit identification signal of the UE from a network side; and a transmission component, configured to determine a specific resource for transmitting the identification signal according to the resource position information, and transmit the identification signal of the UE on the specific resource.

An embodiment of the present invention provides a signal reception device, which includes:

an information acquisition component, configured to acquire information required for receiving identification signals of other UE from a network side;

and a reception and decoding component, configured to receive and decode the identification signals of the other UE according to the information required for receiving the identification signals of other UE.

An embodiment of the present invention provides a signal transfer device, which includes:

an information acquisition component, configured to acquire resource position information used for indicating UE to transmit identification signal of the UE from a network side, and acquire information required for receiving the identification signal of the UE from the network side;

a transmission component, configured to determine a specific resource for transmitting the identification signal according to the resource position information, and transmit the identification signal of the UE on the specific resource;

and a reception and decoding component, configured to receive and decode the identification signals of the UE according to the acquired information required for receiving the identification signals of the UE.

An embodiment of the present invention provides a user equipment including said device.

According to embodiments of the present invention, at a transmission side, the UE acquires resource position information used for indicating the UE to transmit the identification signal of the UE from the network side; and the UE transmits the identification signal of the UE on the specific resource according to the resource position information. Correspondingly, at a reception side, the user equipment (UE) acquires the information required for receiving the identification signals of the other UE from the network side; and the UE receives and decodes the identification signals of the other UE according to the information. In this way, the technical solution of the mutual discovery of UEs under the control of a mobile communication network is realized.

DETAILED DESCRIPTION OF THE EMBODIMENTS

Embodiments of the present invention provide a signal transmission method and a signal transmission device, which are used for realizing the technical solution of the mutual discovery of UEs under the control of a mobile communication network.

In the future development of the mobile communication system, in order to meet the needs of users better, and improve the efficiency of information interaction, a mechanism for realizing mutual discovery and even direct communication between mobile equipments is introduced, and in order to solve the problem of how to discover each other by the mobile equipments, embodiments of the present invention provide a signal transmission method and a signal transmission device, to realize the technical solution of the mutual discovery of the UE under the control of a mobile communication network, and efficiently realize the mutual discovery between the mobile equipments under the control of the network, and reduce a collision probability.

Figure 1:
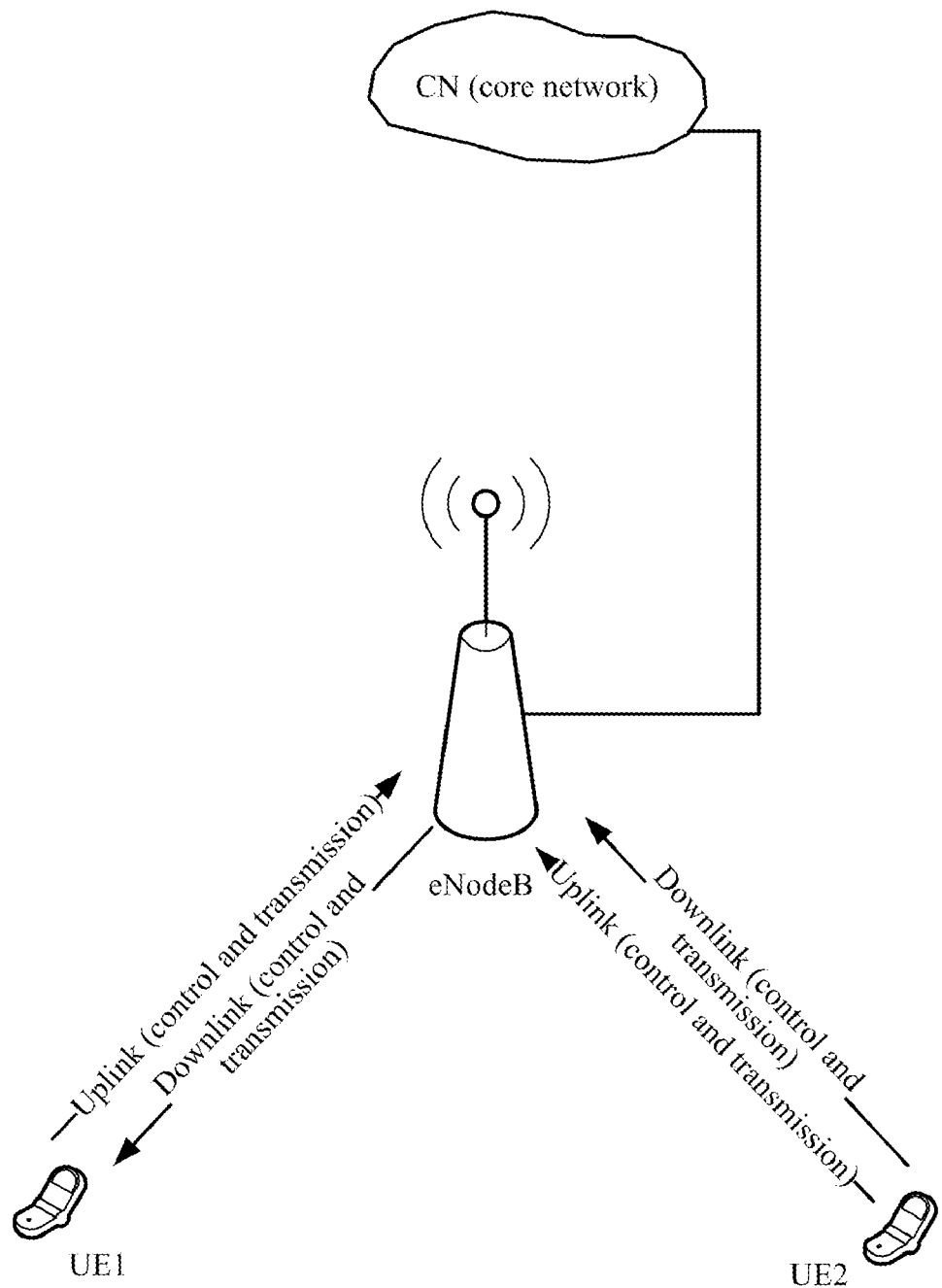
FIG. 1 is a schematic diagram of the principle of a mobile communication system in the background art.
Figure 2:
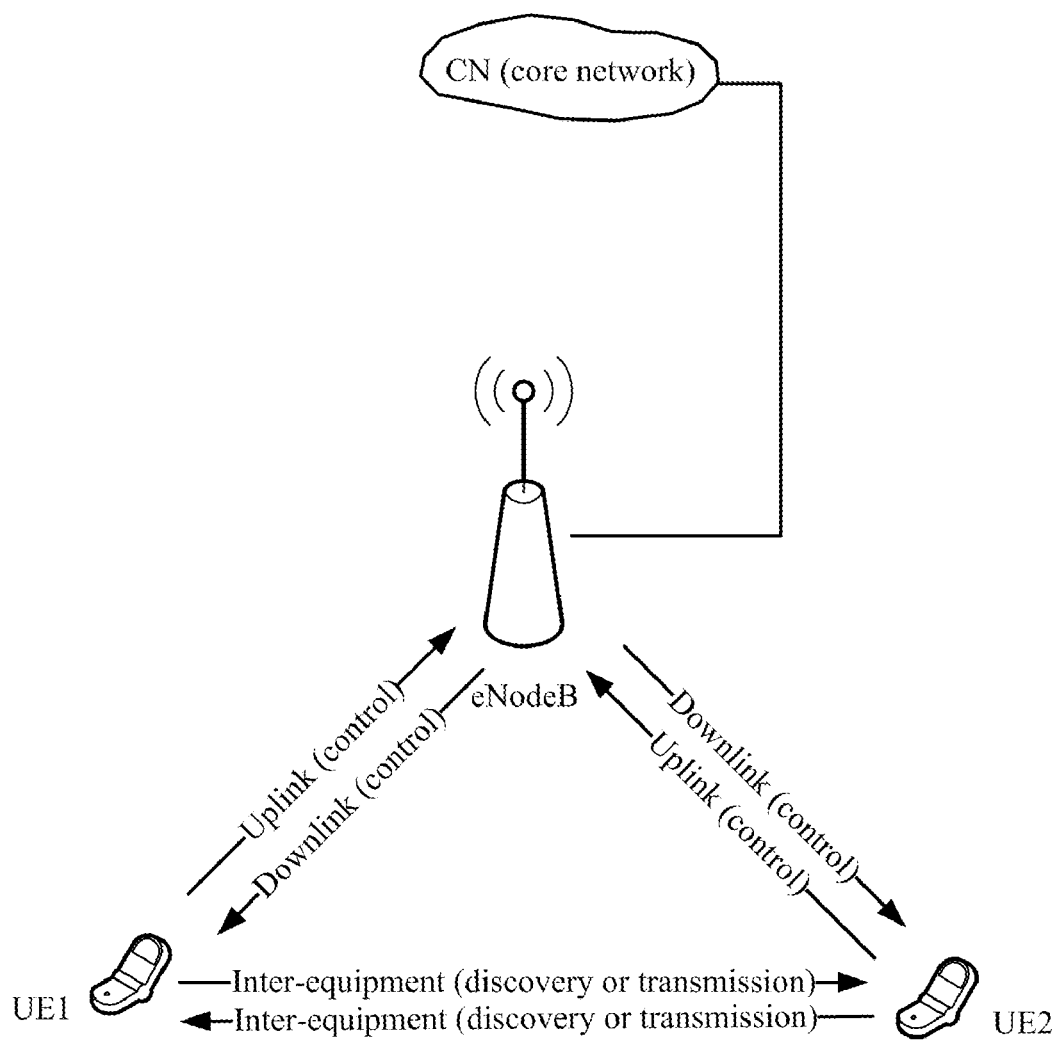
FIG. 2 is a schematic diagram of the principle of D2D communication in the background art.
Figure 3:
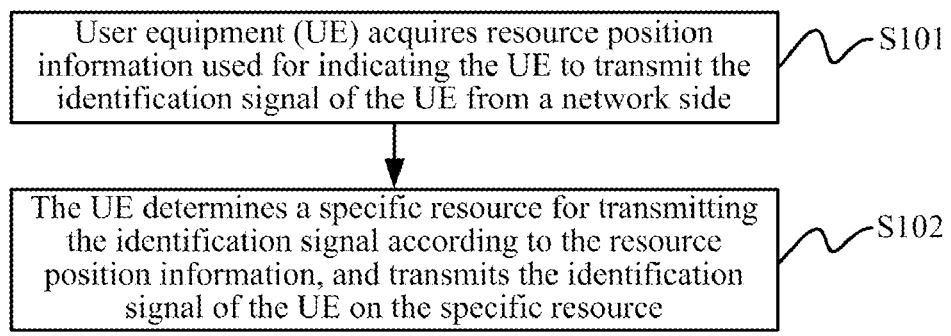
FIG. 3 is a flow schematic diagram of a signal transmission method provided by an embodiment of the present invention.

Referring to FIG. 3, at a transmission end for an identification signal, an embodiment of the present invention provides a signal transmission method, including:

S101, UE acquires, from a network side, resource position information used for indicating the UE to transmit the identification signal of the UE;

and S102, the UE determines a specific resource for transmitting the identification signal according to the resource position information, and transmits the identification signal of the UE on the specific resource.

Preferably, the resource position information includes:

frequency-domain resource position information, time-domain resource position information and the like.

Preferably, the method further includes:

the UE acquires, from the network side, parameter information used for indicating the UE to transmit the identification signal;

and the operation that the UE determines a specific resource for transmitting the identification signal according to the resource position information, and transmits the identification signal of the UE on the specific resource includes:

the UE determines a specific resource for transmitting the identification signal according to the resource position information and the parameter information, and transmits the identification signal of the UE on the specific resource.

Preferably, the parameter information at least includes one of the following parameters:

a power parameter, a period parameter, a repetition parameter, and a modulation coding parameter.

The power parameter, for example, is the maximum transmission power limit for transmitting the identification signal by the UE;

the period parameters, for example, are the minimum period limit for transmitting the identification signal by the UE, and the like;

the repetition parameters, for example, are the repetition times for transmitting the identification signal by the UE in order to ensure the success rate of being discovered by other users, and the like;

the modulation coding parameters for transmitting the identification signal by the UE, and the like.

If needed, the UE may repeatedly and periodically broadcast its own identification signal, wherein the identification signal is the specific identification of each UE, and transmitted according to a specific coding mode or format, and the identification signal contains the identity information of each piece of the UE and/or the information of providing services, and the like.

Preferably, the operation that the UE determines a specific resource for transmitting the identification signal according to the resource position information and the parameter information, and transmits the identification signal of the UE on the specific resource includes:

the UE determines a specific resource for transmitting the identification signal of the UE according to the resource position information;

and the UE transmits the identification signal of the UE on the specific resource in the form of broadcasting according to the parameter information.

That is to say, when the discovered UE needs to be discovered by other users, the discovered UE transmits the identification signal on the specific resource in the form of broadcasting, in a pattern of avoiding a collision and increasing the success rate to the greatest extent, according to the resource position information and the parameter information parameters acquired from the network side.

Wherein the discovered UE needs to be discovered by other users, for example, a user has a corresponding service need, and turns on a function switch for D2D discovery; or the user has the need, the network allows the user to carry out a D2D discovery process according to an algorithm, control and the like.

The identification signal is transmitted to the surrounding on the specific source, for example, the UE randomly selects a time-frequency position, from a section of time-frequency positions with close distances, within the resource range configured by the network, and transmits the identification signal to the surrounding in the form of broadcasting on the selected time-frequency position.

Figure 4:
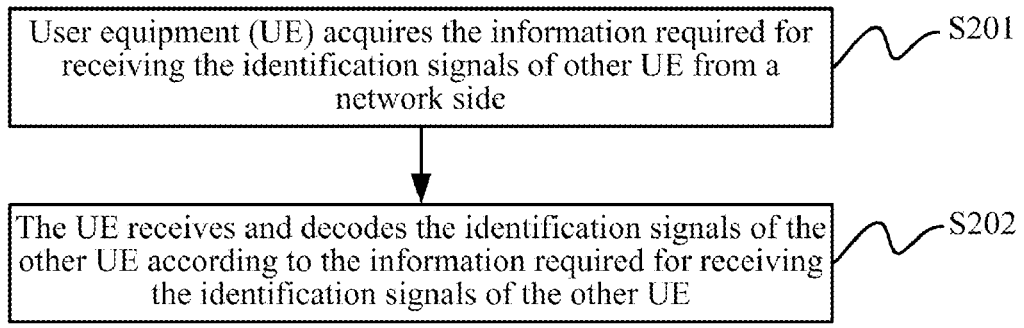
FIG. 4 is a flow schematic diagram of a signal reception method provided by an embodiment of the present invention.

Referring to FIG. 4, at a reception end for an identification signal, an embodiment of the present invention provides a signal reception method including:

S201, UE acquires, from a network side, the information required for receiving the identification signals of other UE;

and S202, the UE receives and decodes the identification signals of the other UE according to the information required for receiving the identification signals of the other UE.

Preferably, the information required for receiving the identification signals of the other UE at least includes:

resource position information for transferring the identification signals of the other UE and the modulation coding information of the identification signals of the other UE.

Preferably, the operation that the UE receives and decodes the identification signals of the other UE according to the information required for receiving the identification signals of the other UE comprises:

the UE receives the identification signals of the other UE according to the resource position information;

and the UE decodes the identification signals of the other UE according to the modulation coding information.

That is to say, the UE receives and decodes the identification signals sent by the surrounding UE at the resource position, for sending the identification signals, configured by the network, according to the configured mode.

Further, subsequent processing may further be carried out on the identification signals of the interested discovered UE, for example, the UE may request the network for further detailed information of the interested discovered UE, or carry out D2D communication with the interested discovered UE under the assistance of the network, and the like.

Wherein the process of acquiring, by the UE, various configuration information from the network side, may be specified in advance according to standards, or transmitted through a common signaling, that is, by means of broadcasting, or transmitted to the UE actively by a base station, or transmitted to the UE through a dedicated signaling based on the request of the UE.

Four specific embodiments of the present invention are described below.

Embodiment 1

A Basic Mode

Figure 5:
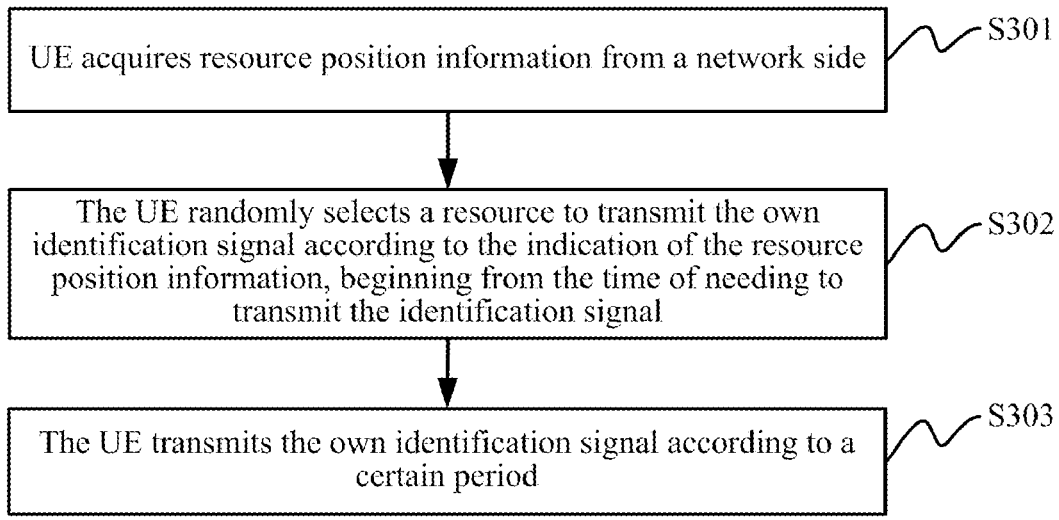
FIG. 5 is a schematic diagram of the process of transmitting an identification signal provided by embodiment 1 of the present invention.

At a transmission end for an identification signal, referring to FIG. 5, the process of transmitting the identification signal is as follows:

operation S301: UE acquires resource position information from a network side;

operation S302: the UE randomly selects a resource to transmit its own identification signal and wait to be discovered by surrounding users according to the indication of the resource position information, beginning from the time when the identification signal needs to be transmitted (for example, the time when the UE turns on a function switch);

wherein there are the following two principles for randomly selecting of the resource:

1: a resource is randomly selected with an equal probability in all frequency-domain resources reserved for the identification signal, within an identification signal sub-frame closest to the current sub-frame (that is, the sub-frame capable of transmitting the identification signal according to the configuration of the network side);

and 2: an identification signal sub-frame is randomly selected in a plurality of consecutive identification signal sub-frames, beginning from an identification signal sub-frame closest to the current sub-frame at first, and then a resource is randomly selected with an equal probability in all frequency-domain resources reserved for the identification signal, within the selected identification signal sub-frame.

In the case that the sizes of resources used for transmitting the identification signal within each identification signal sub-frame are inconsistent, the UE may randomly select a resource with an equal probability from all resource elements capable of being used for transmitting the identification signal within the plurality of consecutive identification signal sub-frames.

Operation S303: in response to the changes of the surrounding users, the UE may transmit the own identification signal according to a certain period, so as to facilitate the discovery of the UE by newly close users, wherein the minimum period of transmitting the identification signal by the UE should meet the configuration limit of the period parameters transmitted by the network side, so as to prevent the users from frequently transmitting the identification signals to cause interference on the other users, increase of collision probability and decrease of an overall discovery probability. The operation S302 is repeated when the UE needs to transmit an identification signal next time.

Embodiment 2

A Repetition Mode

Figure 6:
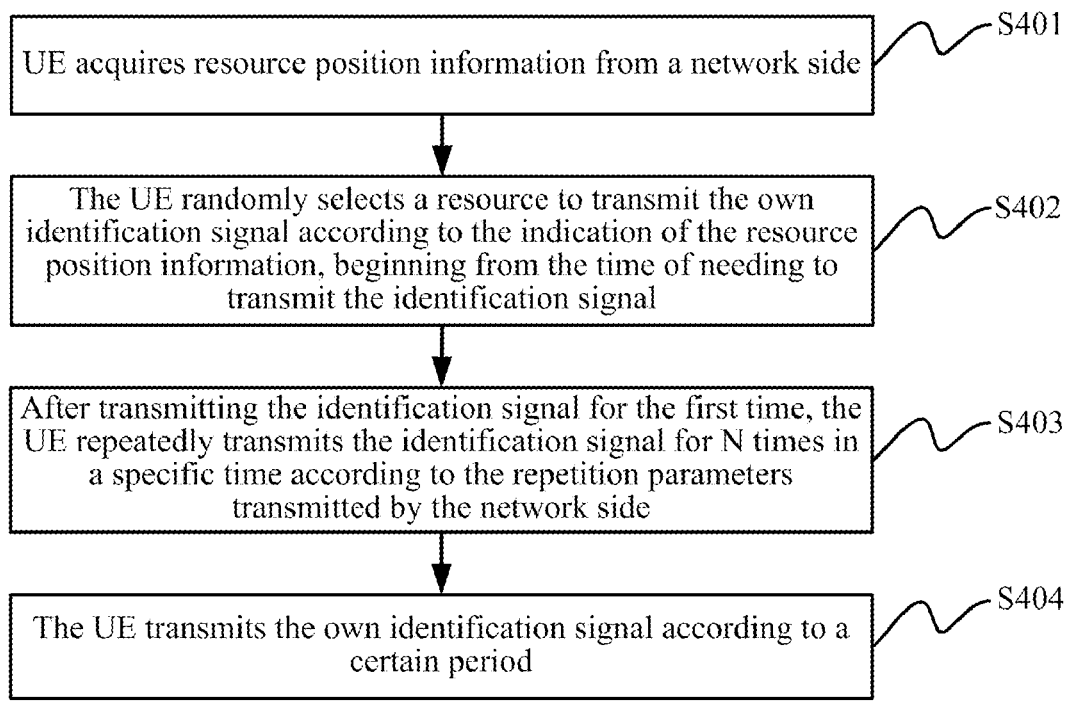
FIG. 6 is a schematic diagram of the process of transmitting an identification signal provided by embodiment 2 of the present invention.

At a transmission end for an identification signal, referring to FIG. 6, the process of transmitting the identification signal is as follows:

operation S401: UE acquires resource position information from a network side;

operation S402: the UE randomly selects a resource to transmit its own identification signal and wait to be discovered by surrounding users according to the indication of the resource position information, beginning from the time when the identification signal needs to be transmitted, wherein the principles for randomly selecting the resource may refer to embodiment 1.

Operation S403: after transmitting the identification signal for the first time, the UE repeatedly transmits the identification signal for N times in a specific time according to the repetition parameters transmitted by the network side, and the probability of discovering the UE may be increased through such repeatability in response to resource collision; wherein the specific time and N are both repetition parameters, and N, for example, may be set to be 2 or 3; and the specific time length of the specific time may be set according to actual needs, and the unit is millisecond, for example, the specific time length may be 10 milliseconds.

In an embodiment of the present invention, N is a positive integer.

There are the following rules of repeatedly transmitting the identification signal:

1, the UE repeats according to a specific sub-frame interval, for example, after the UE transmits the identification signal in a sub-frame for the first time, the UE randomly selects a frequency-domain resource reserved for the identification signal in each of the N−1 identification signal sub-frames next to the sub-frame, so as to repeatedly transmit the identification signal;

For example, the sub-frame interval may be preconfigured as 1, and the UE may transmit in the next identification signal sub-frame after initially transmitting the identification signal, until the transmission is repeated for N times.

2, The UE repeats according to a random sub-frame interval, for example, the interval between the sub-frame for transmitting the identification signal for the first time by the UE and the sub-frame for transmitting the identification signal for the second time by the UE may meet a certain random distribution, for example, the random distribution of [0, M], and on the basis of meeting a certain random distribution of a time domain, the UE randomly selects a frequency-domain resource, reserved for the identification signal, in the identification signal sub-frame selected for the second time, so as to repeatedly transmit the identification signal, until the transmission is repeated for N times.

The value of M may be set according to actual needs, for example, may be set to be 10 sub-frames.

In an embodiment of the present invention, M is a positive integer.

In particular, as such repetition aims at increasing the probability of discovery at a time, thus the repetition period may be relatively short, and may be millisecond level.

Operation S404: In response to the changes of the surrounding users, the UE may still transmit its own identification signal periodically, so as to facilitate discovery of the UE by newly close users, wherein the minimum period of transmitting the identification signal by the UE should meet the configuration limit transmitted by the network side, so as to prevent the users from frequently transmitting the identification signals to cause interference on the other users, and increasing the collision probability and decreasing an overall discovery probability. The operation S402 and the operation S403 are repeated when the UE needs to transmit an identification signal next time.

Embodiment 3

A Monitoring Mode

Figure 7:
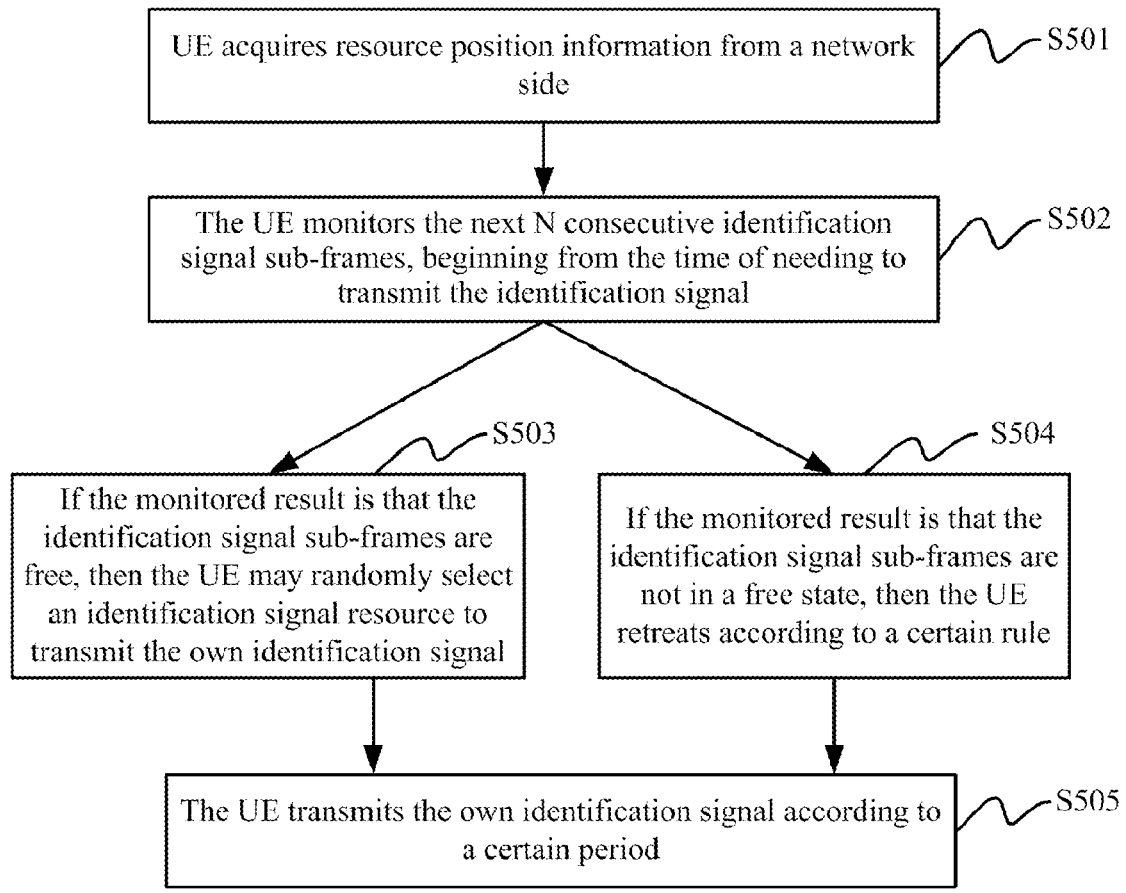
FIG. 7 is a schematic diagram of the process of transmitting an identification signal provided by embodiment 3 of the present invention.

At a transmission end for an identification signal, referring to FIG. 7, the process of transmitting the identification signal is as follows:

operation S501: UE acquires resource position information from a network side;

operation S502: the UE monitors the N consecutive identification signal sub-frames, wherein the N consecutive identification signal sub-frames are the next N consecutive identification signal sub-frames beginning from the time of needing to transmit the identification signal, and executes the following operation S503 or operation 504 according to the monitored result;

operation S503: if the monitored result is that the identification signal sub-frames are free, then the UE may randomly select an identification signal resource to transmit its own identification signal, wherein the principles for randomly selecting the resource may refer to embodiment 1.

The principles for judging whether the identification signal sub-frame is free or not may be as follows:

1, all of the N consecutive identification signal sub-frames are free, wherein an identification signal sub-frame being free may be defined as that no transmission for identification signals of any other user is detected in the frequency-domain resources of all the identification signals in the identification signal sub-frame;

2, all of the N consecutive identification signal sub-frames are lightly loaded, wherein the identification signal sub-frames being lightly loaded may be defined as that the ratio between the quantity of the resources for transmitting the identification signals of the other users and the total of the whole unlink identification resources is detected to be less than a certain threshold value in the frequency-domain resources of all the identification signals in the sub-frame.

For example, the N consecutive identification signal sub-frames are determined to be all lightly loaded, when the ratio between the quantity of the resources for transmitting the identification signals of the other users and the total of the whole unlink identification resources is detected to be less than 50% in the frequency-domain resources of all the identification signals in the sub-frame.

3, The integral of N identification signal sub-frames being lightly loaded means that the ratio between the quantity of the resources for transmitting the identification signals of the other users and the total of the whole unlink identification resources is detected to be less than a certain threshold value in all the reserved frequency-domain resources of the N consecutive identification signal sub-frames.

For example, the integral of N identification signal sub-frames is determined to be lightly loaded when the ratio between the quantity of the resources for transmitting the identification signals of the other users and the total of the whole unlink identification resources is detected to be less than 50% in all the reserved frequency-domain resources of the N consecutive identification signal sub-frames.

Operation S504: if the monitored result is that the identification signal sub-frames are not in a free state, then the UE retreats according to a certain rule.

The retreating rule may be as follows:

the UE waits for a certain time according to a certain random distribution and the retreating parameter configured by the network, for example, the UE may select uniformly-distributed random numbers in a time [0, T] to wait, wherein T is a positive integer, and then operation 2 is carried out; or, the UE may continuously detect N consecutive identification signal sub-frames according to a window mechanism until free conditions are met, and then the UE may directly carry out operation S503, wherein the window mechanism is that the UE continuously maintains a window, N consecutive identification signal sub-frames are always maintained in the window, whether the N identification signal sub-frames meet threshold value requirements is calculated, and if threshold value requirements are met, then subsequent transmission is carried out, otherwise, the oldest identification signal sub-frame in the window is eliminated, and the newest next identification signal sub-frame is contained in the window, and threshold value determination for the N consecutive sub-frames is carried out again.

Operation S505: in response to the changes of the surrounding users, the UE may still transmit its own identification signal according to a certain period, so as to facilitate the discovery of the UE by newly close users, wherein the minimum period of transmitting the identification signal by the UE should meet the configuration limit transmitted by the network side, so as to prevent the users from frequently transmitting the identification signals to cause interference on the other users, and increasing the collision probability and decreasing an overall discovery probability. Operation S502 to operation S503 are repeated, or S504 are repeated, when the UE needs to transmit an identification signal next time.

Embodiment 4

A Monitoring and Repetition Mode

Figure 8:
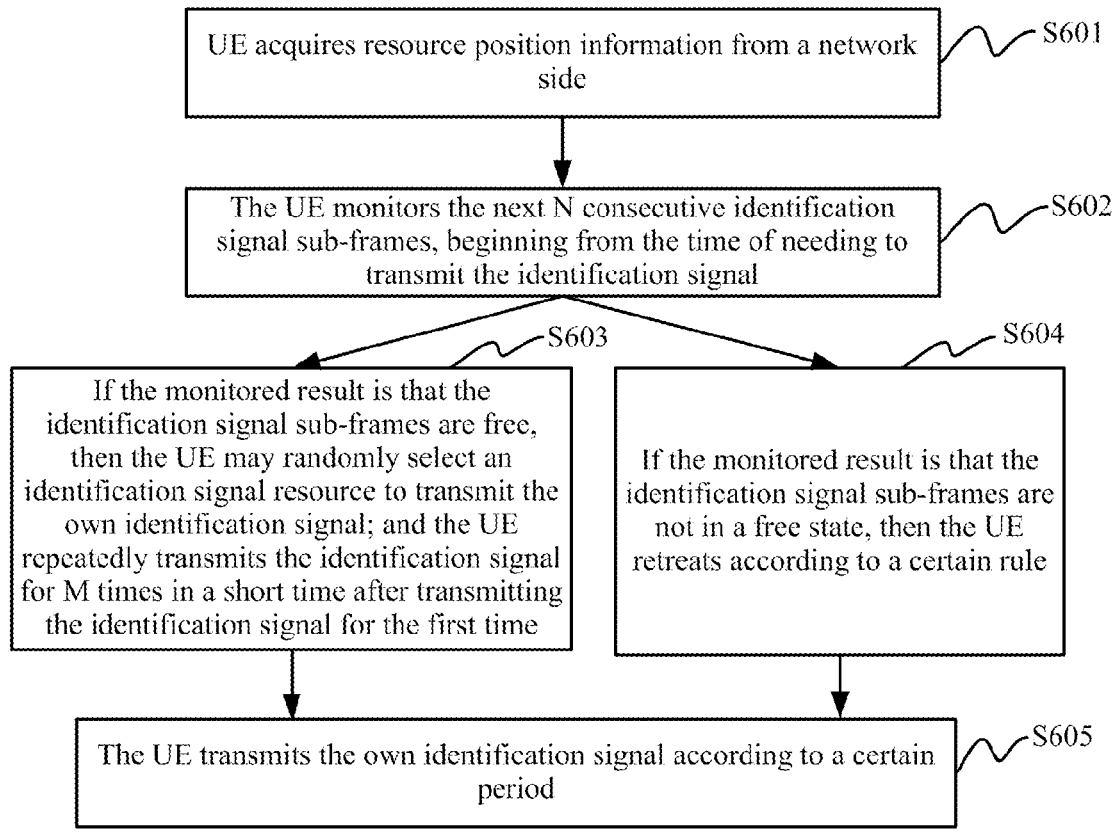
FIG. 8 is a schematic diagram of the process of transmitting an identification signal provided by embodiment 4 of the present invention.

At a transmission end for an identification signal, referring to FIG. 8, the process of transmitting the identification signal is as follows:

operation S601: UE acquires resource position information from a network side;

operation S602: the UE monitors the N consecutive identification signal sub-frames, wherein the N consecutive identification signal sub-frames are the next N consecutive identification signal sub-frames beginning from the time of needing to transmit the identification signal, and executes the following operation S603 or operation 604 according to the monitored result;

operation S603: if the monitored result is that the identification signal sub-frames are free, then the UE may randomly select an identification signal resource to transmit its own identification signal; and the UE repeatedly transmits the identification signal for M times in a short time after transmitting the identification signal for the first time, and in such repetition, the probability of discovery may be increased in response to a collision, wherein the principles for randomly selecting the resource may refer to embodiment 1.

The principles for judging whether the identification signal sub-frame is free or not may refer to embodiment 3.

The rule of the repetition may refer to embodiment 2.

Operation S604: if the monitored result is that the identification signal sub-frames are not in a free state, then the UE retreats according to a certain rule.

The retreating rule may refer to embodiment 3.

Operation S605: in response to the changes of the surrounding users, the UE may still transmit its own identification signal according to a certain period, so as to facilitate the discovery of the UE by newly close users, wherein the minimum period of transmitting the identification signal by the UE should meet the configuration limit transmitted by the network side, so as to prevent the users from frequently transmitting the identification signals to cause interference on the other users, and increasing the collision probability and decreasing an overall discovery probability. The operation S602 to operation S603 are repeated, or Operation 604 are repeated, when the UE needs to transmit an identification signal next time.

Figure 9:
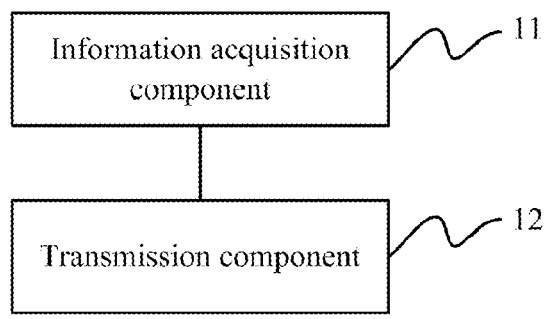
FIG. 9 is a structure schematic diagram of a signal transmission device provided by an embodiment of the present invention.

Referring to FIG. 9, an embodiment of the present invention provides a signal transmission device, including:

an information acquisition component 11 configured to acquire, from a network side, resource position information used for indicating UE to transmit the identification signal of the UE;

and a transmission component 12 configured to determine a specific resource for transmitting the identification signal according to the resource position information, and transmit the identification signal of the UE on the specific resource.

Preferably, the resource position information includes: frequency-domain resource position information and time-domain resource position information.

Preferably, the information acquisition component 11 is further configured to:

acquire, from the network side, parameter information used for indicating the UE to transmit the identification signal;

and the transmission component 12 is specifically configured to:

determine a specific resource for transmitting the identification signal according to the resource position information and the parameter information, and transmit the identification signal of the UE on the specific resource.

Preferably, the parameter information at least includes one of the following parameters:

a power parameter, a period parameter, a repetition parameter, and a modulation coding parameter.

Preferably, the transmission component 12 is specifically configured to:

determine a specific resource for transmitting the identification signal of the UE according to the resource position information;

and transmit the identification signal of the UE on the specific resource in the form of broadcasting according to the parameter information.

Preferably, the transmission component 12 transmitting the identification signal of the UE on the specific resource in the form of broadcasting according to the parameter information includes:

selecting a resource to transmit the own identification signal according to the indication of the resource position information, beginning from the time when the identification signal needs to be transmitted;

after transmitting the identification signal for the first time, repeatedly transmitting the identification signal for N times in a specific time according to the repetition parameters transmitted by the network side, wherein the specific time and N are repetition parameters.

Preferably, after transmitting the identification signal for the first time, the transmission component 12 repeatedly transmitting the identification signal for N times in a specific time according to the repetition parameters transmitted by the network side includes:

repeatedly transmitting the identification signal for N times in a specific time according to a specific sub-frame interval; or, repeatedly transmitting the identification signal for N times in a specific time according to a random sub-frame interval.

Preferably, the transmission component 12 transmitting the identification signal of the UE on the specific resource in the form of broadcasting according to the parameter information includes:

monitoring the N consecutive identification signal sub-frames, wherein the N consecutive identification signal sub-frames are the next N consecutive identification signal sub-frames beginning from when the identification signal needs to be transmitted;

and if the identification signal sub-frame is free, randomly selecting an identification signal resource to transmit the own identification signal.

Preferably, the transmission component 12 is further configured to:

if the monitored result is that the identification signal sub-frames are not in a free state, wait for a preset time length according to preset random distribution parameters, and then monitor again the next N consecutive identification signal sub-frames beginning from the time of needing to transmit the identification signal; or, detect N consecutive identification signal sub-frames in real time according to a window mechanism until the N consecutive identification signal sub-frames are free, so that the UE randomly selects an identification signal resource to transmit its own identification signal.

Preferably, the transmission component 12 determining that the identification signal sub-frames are free includes:

all of the N consecutive identification signal sub-frames are free; or, the loads of the N consecutive identification signal sub-frames are all less than a preset threshold value; or, the load of the integral of the N identification signal sub-frames are is less than a preset threshold value.

Figure 10:
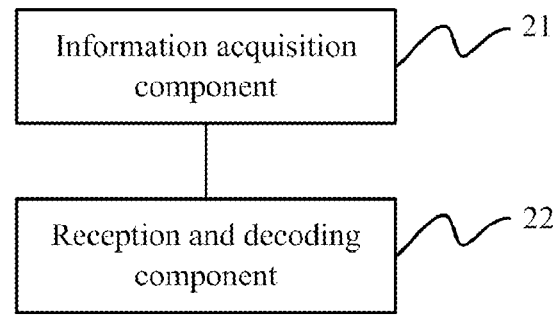
FIG. 10 is a structure schematic diagram of a signal reception device provided by an embodiment provided by embodiment of the present invention.

Referring to FIG. 10, an embodiment of the present invention provides a signal reception device, including:

an information acquisition component 21 configured to acquire, from a network side, the information required for receiving the identification signals of the UE;

and a reception and decoding component 22 configured to receive and decode the identification signals of the UE according to the acquired information required for receiving the identification signals of the other UE.

Preferably, the information required for receiving the identification signals of the other UE at least includes:

resource position information for transferring the identification signals of the UE and the modulation coding information of the identification signals of the UE.

Preferably, the reception and decoding component 22 is specifically configured to:

receive the identification signals of the UE according to the resource position information; and decode the identification signal of the UE according to the modulation coding information.

A signal transfer device provided by embodiments of the present invention may be used as a reception device for an identification signal or a transmission device for an identification signal, and the device includes:

an information acquisition component configured to acquire, from the network side, resource position information used for indicating the UE to transmit the identification signal; and acquire the information required for receiving the identification signal of the UE from the network side;

a transmission component configured to determine a specific resource for transmitting the identification signal according to the resource position information, and transmit the identification signal of the UE on the specific resource;

and a reception and decoding component configured to receive and decode the identification signals of the UE according to the acquired information required for receiving the identification signals of the UE.

Figure 11:
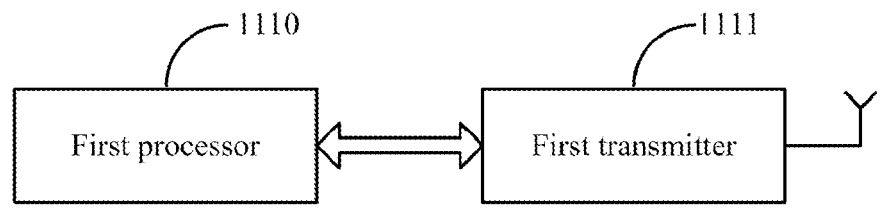
FIG. 11 is a structure schematic diagram of another signal transmission device provided by an embodiment of the present invention.

As shown in FIG. 11, another signal transmission device provided by an embodiment of the present invention includes a first processor 1110 and a first transmitter 1111.

The first processor 1110 is configured to acquire, from a network side, resource position information used for indicating user equipment (UE) to transmit the identification signal of the UE;

and the first transmitter 1111 is configured to determine a specific resource for transmitting the identification signal according to the resource position information, and transmit the identification signal of the UE on the specific resource.

Preferably, the resource position information includes:

frequency-domain resource position information and time-domain resource position information.

Preferably, the first processor 1110 is further configured to:

acquire, from the network side, parameter information used for indicating the UE to transmit the identification signal;

and the transmitter 1111 is specifically configured to:

transmit the identification signal of the UE on the specific resource according to the parameter information.

Preferably, the parameter information at least includes one of the following parameters:

a power parameter, a period parameter, a repetition parameter, and a modulation coding parameter.

Preferably, the first transmitter 1111 is specifically configured to:

determine a specific resource for transmitting the identification signal of the UE according to the resource position information;

and determine a specific resource for transmitting the identification signal according to the parameter information, and transmit the identification signal of the UE in the form of broadcasting on the specific resource.

Preferably, the first transmitter 1111 transmitting the identification signal of the UE on the specific resource in the form of broadcasting according to the parameter information includes:

selecting a resource to transmit the own identification signal according to the indication of the resource position information, beginning from the time of needing to transmit the identification signal;

after transmitting the identification signal for the first time, repeatedly transmitting the identification signal for N times in a specific time according to the repetition parameters transmitted by the network side, wherein the specific time and N are repetition parameters;

wherein N is a positive integer.

Preferably, the first transmitter 1111 is specifically configured to: after transmitting the identification signal for the first time, repeatedly transmit the identification signal for N times in a specific time according to the repetition parameters transmitted by the network side, and repeatedly transmit the identification signal for N times in a specific time according to a specific sub-frame interval or a random sub-frame interval.

Preferably, the first transmitter 1111 is specifically configured to: transmit the identification signal of the UE in the form of broadcasting on the specific resource according to the parameter information, and monitor the next N consecutive identification signal sub-frames, beginning from the time when the identification signal needs to be transmitted, wherein N is a positive integer;

and if the N consecutive identification signal sub-frames are free, randomly select an identification signal resource to transmit the own identification signal.

Preferably, the first transmitter 1111 is further configured to: if the identification signal sub-frames are not in a free state, wait for a preset time length according to preset random distribution parameters, and monitor again the next N consecutive identification signal sub-frames beginning from the time of needing to transmit the identification signal; or, detect N consecutive identification signal sub-frames in real time according to a window mechanism until the N consecutive identification signal sub-frames are free, then the UE randomly selects an identification signal resource to transmit the own identification signal.

Preferably, the first transmitter 1111 determining that the identification signal sub-frames are free includes:

all of the N consecutive identification signal sub-frames are free; or, the loads of the N consecutive identification signal sub-frames are all less than a preset threshold value; or, the loads of the integral of the N identification signal sub-frames are all less than a preset threshold value.

Figure 12:
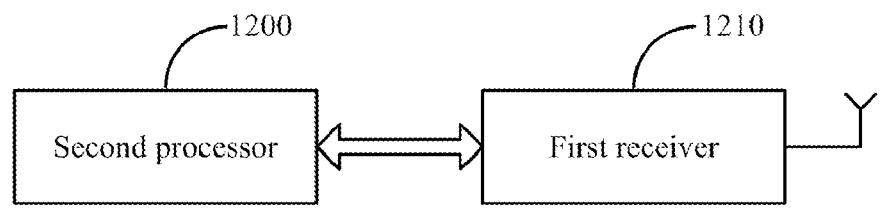
FIG. 12 is a structure schematic diagram of another signal reception device provided by an embodiment of the present invention.

As shown in FIG. 12, another signal reception device provided by an embodiment of the present invention includes a second processor 1200 and a first receiver 1210.

The second processor 1200 is configured to acquire, from a network side, the information required for receiving the identification signals of the UE; and the first receiver 1210 is configured to receive and decode the identification signals of the UE according to the acquired information required for receiving the identification signals of the other UE.

Preferably, the information required for receiving the identification signals of the other UE includes:

resource position information for transferring the identification signals of the UE and the modulation coding information of the identification signals of the UE.

Preferably, the first receiver 1210 is specifically configured to:

receive the identification signal of the UE according to the resource position information; and decode the identification signal of the UE according to the modulation coding information.

Figure 13:
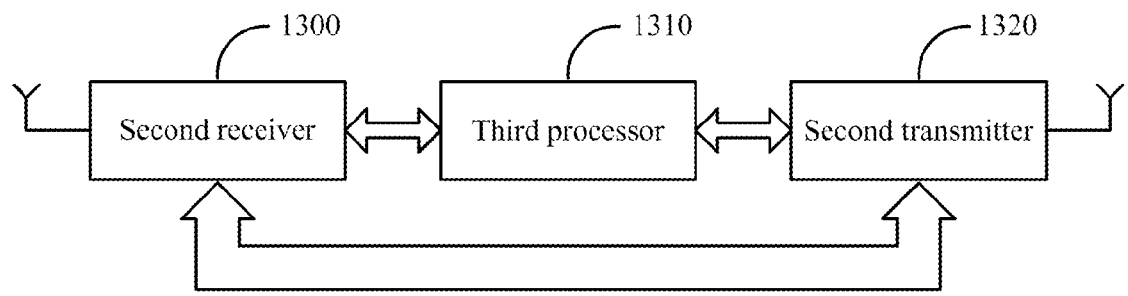
FIG. 13 is a structure schematic diagram of a signal transfer device provided by an embodiment of the present invention.

As shown in FIG. 13, another signal transfer device provided by an embodiment of the present invention includes a third processor 1300, a second transmitter 1310 and a second receiver 1320.

The third processor 1300 is configured to acquire, from a network side, resource position information used for indicating the user equipment (UE) to transmit the identification signal of the UE; and acquire, from the network side, the information required for receiving the identification signal of the UE;

the second transmitter 1310 is configured to determine a specific resource for transmitting the identification signal according to the resource position information, and transmit the identification signal of the UE on the specific resource;

and the second receiver 1320 is configured to receive and decode the identification signals of the UE according to the acquired information required for receiving the identification signals of the UE.

User equipment provided by the embodiments of the present invention includes the devices above, that is, the user equipment may be used as a reception device for an identification signal or a transmission device for an identification signal.

In conclusion, in embodiments of the present invention, the UE acquires the parameter information of the identification signal from the network side, and finishes transmission for the identification signal under certain rules, thus the surrounding users discover the close UE through an analysis of the identification signal, therefore, the technical solution of the mutual discovery of UEs is given, the collision is effectively avoided, and the success probability of discovery is increased.

Those skilled in the art should understand that, embodiments of the present invention may be provided as methods, systems or computer program products. Therefore, the forms of all-hardware embodiments, all-software embodiments or embodiments combining a software aspect with a hardware aspect can be adopted in the present invention. Moreover, the form of computer program products implemented on one or more computer available storage mediums (including but not limited to magnetic disk storages, optical storages and the like) containing computer available program codes can be adopted in the present invention.

The present invention is described by referring to the flow diagrams and/or block diagrams of methods, equipment (systems) and computer program products according to embodiments of the present invention. It should be understood that each flow and/or block in the flow diagrams and/or block diagrams, and the combination of flows and/or blocks in the flow diagrams and/or block diagrams can be realized by computer program instructions. The computer program instructions can be provided to the processors of universal computers, special computers, embedded processors or other programmable data processing equipment to generate a machine, so that devices used for realizing functions appointed in one or more flows of the flow diagram and/or one or more blocks of the block diagram are generated by virtue of the instructions executed by the processors of the computers or the other programmable data processing equipment.

The computer program instructions can also be stored in computer readable storages capable of guiding the computers or the other programmable data processing equipment to work in a specific mode, so that the instructions stored in the computer readable storages generate manufactured products including instruction devices, and the instruction devices are used for realizing the functions appointed in one or more flows of the flow diagram and/or one or more blocks of the block diagram.

The computer program instructions can also be loaded on the computers or the other programmable data processing equipment, so that a series of operation steps are executed on the computers or the other programmable data processing equipment to generate processing realized by the computers, thus the instructions executed on the computers or the other programmable data processing equipment provide a operation used for realizing the functions appointed in one or more flows of the flow diagram and/or one or more blocks of the block diagram.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A signal transmission method, comprising:
acquiring, by a UE, resource position information, used for indicating the UE to transmit identification signal of the UE, from a network side; and
determining, by the UE, a specific resource for transmitting the identification signal according to the resource position information, and transmitting the identification signal of the UE on the specific resource;
wherein the method further comprises:
acquiring, by the UE, parameter information used for indicating the UE to transmit the identification signal from the network side;
wherein the transmitting, by the UE, the identification signal of the UE on the specific resource comprises:
transmitting, by the UE, the identification signal of the UE on the specific resource according to the parameter information;
wherein transmitting, by the UE, the identification signal of the UE on the specific resource according to the parameter information comprises:
monitoring, by the UE, N consecutive identification signal sub-frames, wherein the N consecutive identification signal sub-frames are next N consecutive identification signal sub-frames beginning from the time of needing to transmit the identification signal, and N is a positive integer; and randomly selecting, by the UE, an identification signal resource to transmit its own identification signal if the N consecutive identification signal sub-frames are free; and/or
selecting, by the UE, a resource to transmit its own identification signal according to an indication of the resource position information, beginning from time of needing to transmit the identification signal; and repeatedly transmitting, by the UE, the identification signal for N times in a specific time according to repetition parameters transmitted by the network side, after transmitting the identification signal for the first time, wherein the specific time and N are the repetition parameters.

2. The method according to claim 1, wherein transmitting, by the UE, the identification signal of the UE on the specific resource according to the parameter information comprises:
transmitting, by the UE, the identification signal of the UE on the specific resource in a form of broadcasting according to the parameter information.

3. The method according to claim 1, wherein repeatedly transmitting, by the UE, the identification signal for N times in a specific time according to the repetition parameters transmitted by the network side, after transmitting the identification signal for the first time, comprises:
repeatedly transmitting, by the UE, the identification signal for N times in a specific time according to a specific sub-frame interval or a random sub-frame interval,
wherein N is a positive integer.

4. The method according to claim 1, wherein when the identification signal sub-frames are not in a free state, the method further comprises:
waiting, by the UE, for a preset time length according to preset random distribution parameters, and monitoring again the next N consecutive identification signal sub-frames beginning from the time of needing to transmit the identification signal; or,
detecting, by the UE, N consecutive identification signal sub-frames in real time according to a window mechanism until the N consecutive identification signal sub-frames are free, and randomly selecting, by the UE, an identification signal resource to transmit the own identification signal.

5. The method according to claim 1, wherein determining, by the UE, that the identification signal sub-frames are free comprises:
all of the N consecutive identification signal sub-frames are free; or,
loads of the N consecutive identification signal sub-frames are all less than a preset threshold value; or,
load of integral of the N identification signal sub-frames is less than a preset threshold value.

6. The method according to claim 1, wherein the parameter information comprises at least one of following parameters:
a power parameter, a period parameter, a repetition parameter, and a modulation coding parameter.

7. A signal transmission device, comprising:
an information acquisition component, configured to acquire resource position information used for indicating UE to transmit identification signal of the UE from a network side; and
a transmission component, configured to determine a specific resource for transmitting the identification signal according to the resource position information, and to transmit the identification signal of the UE on the specific resource
wherein the information acquisition component is further configured to:
acquire, from the network side, parameter information used for indicating the UE to transmit the identification signal;
and the transmission component is specifically configured to:
transmit the identification signal of the UE on the specific resource according to the parameter information;

wherein the transmission component is specifically configured to:
monitor N consecutive identification signal sub-frames, wherein the N consecutive identification signal sub-frames are next N consecutive identification signal sub-frames beginning from the time of needing to transmit the identification signal, and N is a positive integer; and randomly select an identification signal resource to transmit its own identification signal, if the N consecutive identification signal sub-frames are free; and/or
select a resource to transmit its own identification signal according to an indication of the resource position information, beginning from time of needing to transmit the identification signal; repeatedly transmit the identification signal for N times in a specific time according to repetition parameters transmitted by the network side, after transmitting the identification signal for the first time, wherein the specific time and N are the repetition parameters, wherein N is a positive integer.

8. The device according to claim 7, wherein the transmission component is specifically configured to:
determine a specific resource for transmitting the identification signal of the UE according to the resource position information;
and determine a specific resource for transmitting the identification signal according to the parameter information, and transmit the identification signal of the UE in a form of broadcasting on the specific resource.

9. The device according to claim 7, wherein the transmission component is specifically configured to:
repeatedly transmit the identification signal for N times in a specific time according to the repetition parameters transmitted by the network side, after transmitting the identification signal for the first time, and repeatedly transmit the identification signal for N times in a specific time according to a specific sub-frame interval or a random sub-frame interval.

10. The device according to claim 7, wherein the transmission component is further configured to:
if the identification signal sub-frames are not in a free state, wait for a preset time length according to preset random distribution parameters, and monitor again the next N consecutive identification signal sub-frames beginning from the time of needing to transmit the identification signal; or,
detect N consecutive identification signal sub-frames in real time according to a window mechanism until the N consecutive identification signal sub-frames are free, then the UE randomly selects an identification signal resource to transmit the own identification signal.

11. The device according to claim 7, wherein the transmission component determining that the identification signal sub-frames are free comprises:
all of the N consecutive identification signal sub-frames are free; or,
loads of the N consecutive identification signal sub-frames are all less than a preset threshold value; or,
load of integral of the N identification signal sub-frames is all less than a preset threshold value.

12. The device according to claim 7, wherein the parameter information comprises at least one of following parameters:

a power parameter, a period parameter, a repetition parameter, and a modulation coding parameter.

* * * * *